July 20, 1971     S. E. KAY     3,594,145
METHOD AND APPARATUS FOR FIRE POLISHING THE EDGE
OF A GLASS SHEET WHILE BENDING
Filed March 17, 1969     3 Sheets-Sheet 3

Inventor
SOLOMON ELIJAH KAY

By
Morrison, Kennedy & Campbell
Attorneys

United States Patent Office 3,594,145
Patented July 20, 1971

3,594,145
METHOD AND APPARATUS FOR FIRE POLISHING THE EDGE OF A GLASS SHEET WHILE BENDING
Solomon Elijah Kay, Solihull, England, assignor to Triplex Safety Glass Company Limited, London, England
Filed Mar. 17, 1969, Ser. No. 807,515
Claims priority, application Great Britain, Mar. 20, 1968, 13,544/68
Int. Cl. C03b *29/02*
U.S. Cl. 65—104                    13 Claims

ABSTRACT OF THE DISCLOSURE

In the treatment of a glass sheet having a sharp edge, the glass sheet is heated preparatory to bending, the hot sheet is bent, and during or after bending a continuous peripheral margin of the sheet is exposed and further heat is applied to the margin to round the edge of the sheet.

BACKGROUND OF THE INVENTION

This invention relates to the treatment of glass sheets, and more patricularly to the edge-treatment of sheets having sharp edges where the sheet is heated preparatory to bending or toughening.

Present methods of edge-treatment of glass sheets prior to bending or toughening include grinding a slight chamfer on each of the sharp cut edges of a sheet after the latter has been cut and broken-out from a parent glass sheet. This grinding operation can be carried out by hand or automatically, but in either case the operation entails a risk of damage to the glass sheet due to the further handling which is required. For example, the edge-grinding of a glass sheet may introduce slight flaws or vents in the sheet edges, which flaws or vents will constitute weak spots in the sheet.

The provision of a chamfered or rounded edge on a glass sheet is necessary in order to remove sharp edges which would otherwise cut a glazier's hands when the sheet is ultimately installed in a window. Such sharp edges would also tend to cut the rubber seating which is conventionally used for supporting glass sheets in windows, particularly in the windows of motor vehicles. Furthermore, it is believed that the removal of sharp edges from a glass sheet contributes to the avoidance of flaws or vents in the edges should the sheet subsequently be toughened.

A main object of the present invention is to provide a method of and apparatus for the treatment of glass sheets to remove sharp edges therefrom without any mechanical edge treatment being necessary.

SUMMARY

According to the present invention there is provided a method of treating a glass sheet having a sharp edge in which the sheet is heated preparatory to bending or toughening of the sheet, characterized in that during or after bending or gripping of the sheet a continuous peripheral margin of the sheet is exposed and is further heated to cause rounding of said edge.

According to one method of performing the invention the edge heating is effected by subjecting the exposed margin of the sheet to the action of a heated gas applied along the edge. In an alternative, preferred, method according to the invention the edge heating is effected by coating the said peripheral margin of the sheet with at least one coating of electrically conductive material and passing an electric current through said coating or coatings to cause partial melting of the glass at said margin.

There are preferably two coated regions, said regions comprising respective strips of conductive material adjacent respective sheet edges on respective major surfaces of the sheet. Alternatively, the two coated regions may comprise respective strips of conductive material adjacent respective sheet edges on the peripheral edge surface of the sheet.

Where the sheet is formed by breaking-out from a parent sheet, the edge of the sheet is preferably defined by scoring means which score a line on a parent sheet, the conductive material being applied simultaneously to the major surfaces of the sheet to be broken out adjacent said score line by an applicator device disposed in a fixed position relative to the scoring means. Electrodes are preferably disposed close to but spaced from the edges of the glass sheet, and a high voltage source connected across respective pairs of electrodes so as to cause arcing between the electrodes and the conductive coating, and thereby to permit a heating current to flow through the coating. The coating preferably comprises finely-divided carbon which is burnt away by the passage of the current therethrough.

Apparatus according to the invention for treating a glass sheet comprises a pair of gripping or bending dies, means for heating a glass sheet preparatory to bending or toughening thereof and placing the heated sheet between said dies so that a continuous peripheral margin of the sheet is exposed, and marginal heating means disposed in fixed relationship to the dies for heating the exposed edge of the sheet to cause rounding thereof when the dies are closed.

According to one embodiment of the invention the marginal heating means comprise a plurality of burners mounted on a frame encircling the closed position of the dies, the burners being directed towards the region occupied by the peripheral margin of the said sheet when received between the dies.

Edge gripping means may be provided for suspending a sheet to be treated by an upper edge, the dies being relatively movable horizontally. Where the dies are shaped to effect bending of the sheet the heating of the edge of the sheet is preferably effected while the sheet is held between the dies, after bending has been effected thereby.

DESCRIPTION OF THE PREFERRED EMBODIMENTS

Figure 1:
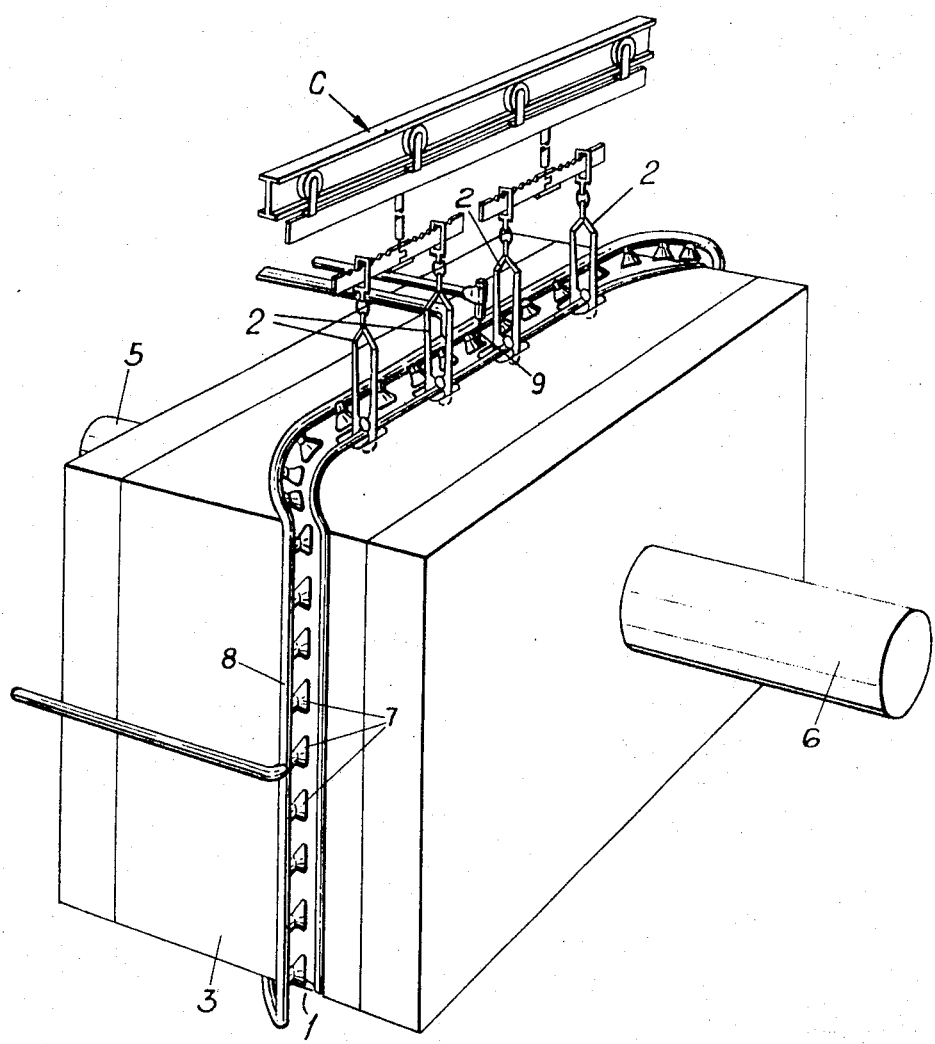
FIG. 1 is a diagrammatic perspective view of part of apparatus for bending glass sheets, said apparatus incorporating one embodiment of the invention.

In the drawings the same reference numerals are employed throughout to indicate like parts:

Referring first to FIG. 1, a glass sheet 1 which is suspended by means of tongs 2 so that the sheet 1 hangs vertically is heated to its softening point in a furnace (not shown). The sheet 1 is transferred by means of an overhead conveyor, part of which is indicated at C, between two dise 3, 4 with a continuous exposed peripheral rams 5, 6 for movement towards and away from each other horizontally. The dies 3, 4 have complementary surfaces so that when closed, as shown, they deform the sheet 1 to a desired curvature. Although the illustrated dies 3, 4 have curvature in horizontal planes only, it will be understood that the invention is equally applicable where the dies 3, 4 have curvature in both horizontal and vertical planes.

The glass sheet 1 and the dies 3, 4 are at a substantially uniform temperature on completion of the bending operation, as has been described in our copending United States patent application Ser. No. 755,270. The tongs 2 may be of the kind described in United Kingdom Patent No. 664,104.

The size of the dies 3, 4 is such that, when closed (FIG. 1) they leave exposed a continuous peripheral margin of the glass sheet 1. The edges of this margin will in general be sharp, particularly where the glass sheet 1 has been formed by cutting or by breaking-out from a parent sheet. Marginal heating means are provided for heating this exposed margin so as to melt, at least partially, the glass around said margin and thereby round off the sharp edges. In the embodiment of FIG. 1 the marginal heating means comprise a plurality of burners 7 mounted on a framework 8 which is disposed in a fixed position relative to the closed position of the dies 3, 4 and which encircles the narrow region occupied by the margin of the glass sheet 1 when the dies 3, 4 are closed. The framework 8 includes a tubular manifold which is supplied with a combustible gas, preferably a sulphur-free gas such as propane. Each burner comprises a nozzle of "fishtail" shape which is elongated in the direction of the adjacent glass margin. The gas supplied to the burners 7 is burnt in an excess of air, ignition being effected by an igniter tube 9 mounted at the mouth of one of the nozzles of the burners 7.

Flames from the burners 7 are directed simultaneously on to the entire exposed edge of the glass sheet 1 for a short period, typically about three seconds, immediately following closure of the dies 3, 4. The burners 7 are then extinguished, the dies 3, 4 separated and the suspended curved glass sheet transported by the tongs 2 to the next stage in the sheet treating process, which stage may be toughening or annealing according to the intended purpose of the sheet.

Figure 2:
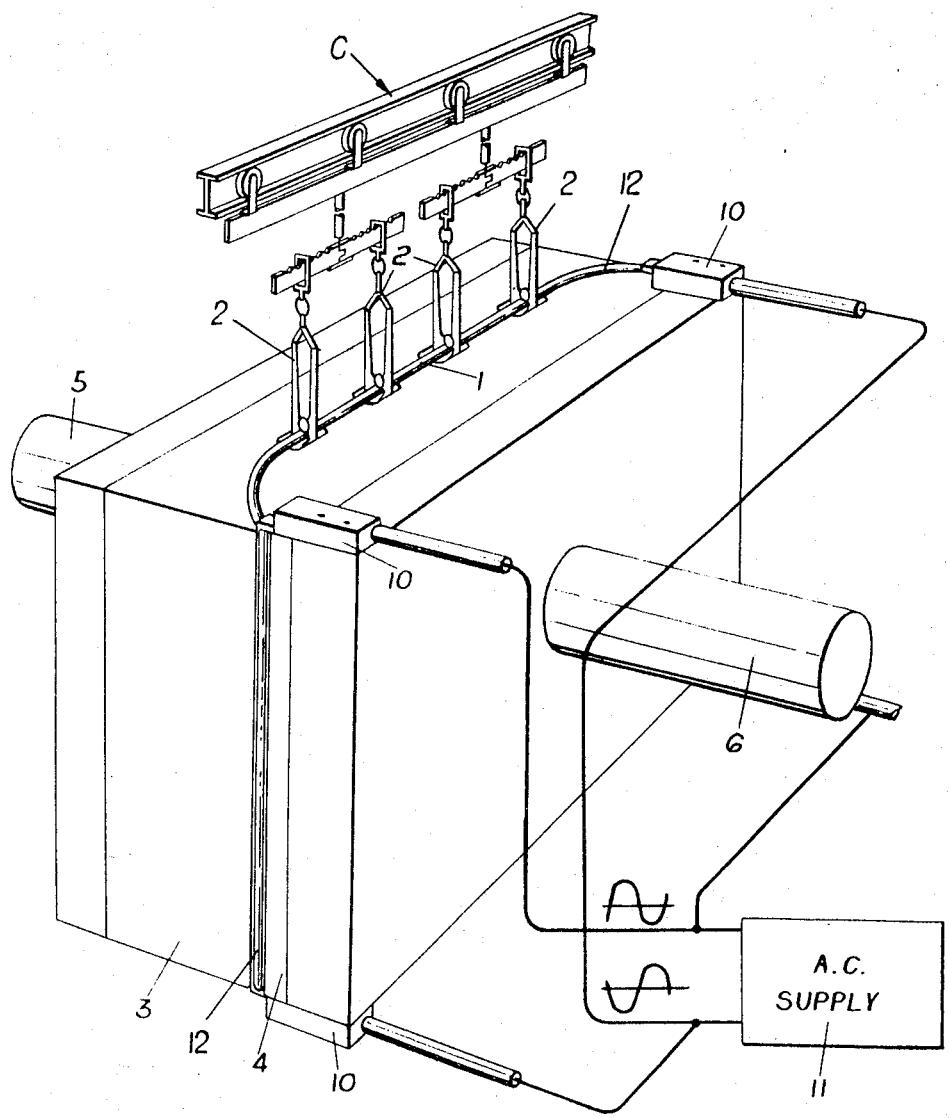
FIG. 2 is a diagrammatic perspective view of sheet bending apparatus similar to that of FIG. 1 incorporating an alternative embodiment of the invention.
Figure 3:
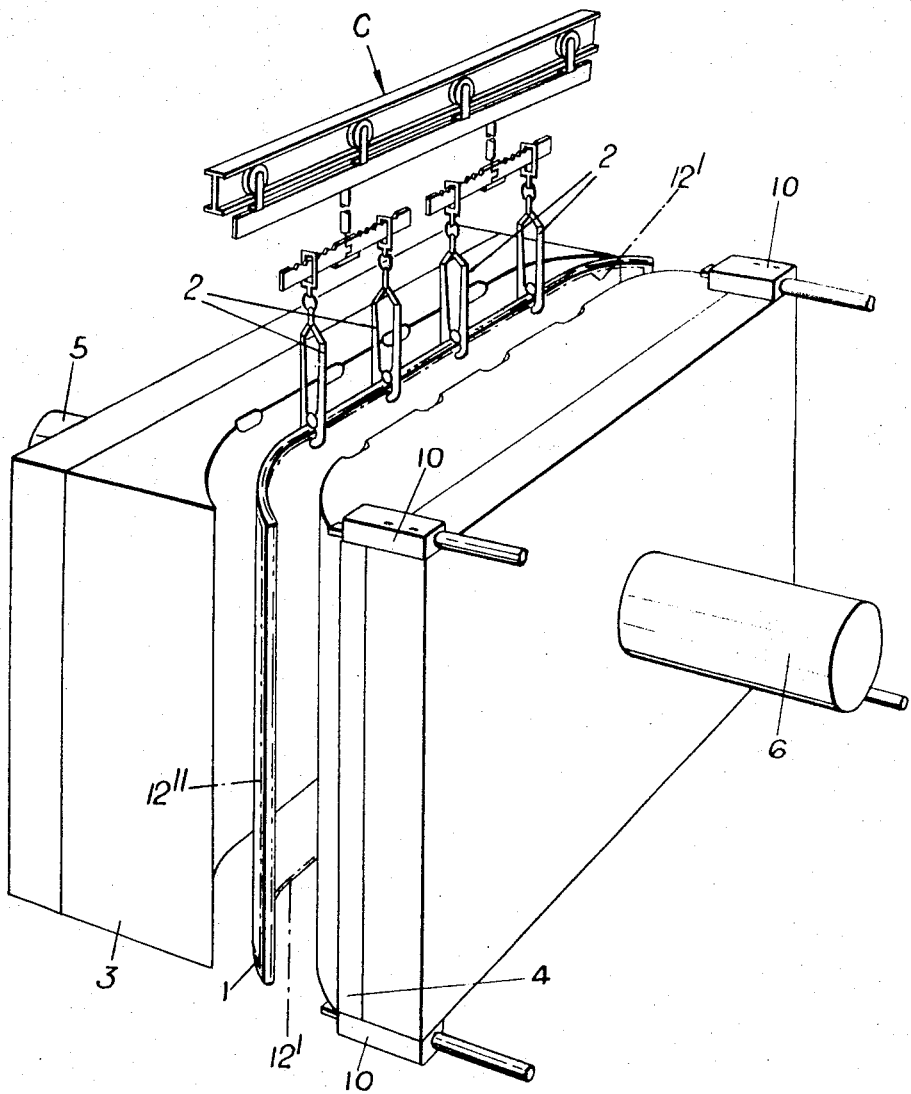
FIG. 3 is a diagrammatic perspective view of the apparatus of FIG. 2 at the completion of a glass sheet bending operation, with the dies separated.

FIGS. 2 and 3 illustrate an alternative method of treating glass sheets in accordance with the invention. The method is again illustrated as applied to a sheet bending process, in which a heated glass sheet 1 is deformed between two dies 3, 4 with a continuous exposed peripheral margin. In this embodiment the heating of the glass margin is effected electrically, and for this purpose an electrically conductive coating 12 is applied to the margin before the glass sheet is heated. The coating is conveniently in the form of a thin layer of finely divided carbon and can be applied to the glass in the form of colloidal graphite by hand using a brush or by means of a spray in conjunction with a suitable mask to protect the major surfaces of the glass sheet which lie inwardly of the marginal region thereof. Alternatively, the coating may be in the form of a paste comprising a suspension of finely divided carbon in an organic binder. After application of the coating through a silk screen, the binder is allowed to dry in air before the glass sheet enters the heating furnace. During the heating the organic binder is driven off leaving the finely divided carbon on the surface of the glass.

The coating 12 can alternatively be applied mechanically by means of a roller which traverses the peripheral edge of the sheet.

For example, two narrow strips 12', 12" (shown in broken outline in FIG. 3) of carbon may be deposited on the glass adjacent the two respective sharp edges of the marginal region, either on the respective major surfaces of the glass sheet or on the peripheral edge surface thereof, each strip being, for example ⅓ inch or less in width. Conveniently, where the glass sheet is formed by breaking-out from a parent sheet, the carbon coatings (12', 12") can be applied to the major sheet surfaces at the same time as the scoring of the parent sheet, using a pair of coating rollers disposed in a fixed relation to the scoring tool and arranged to deposit respective carbon strips on the major surfaces of the glass inwardly of the scored line.

A series of electrodes 10 is mounted on one of the dies, in this example the die 4, each electrode 10 being so positioned that, when the dies 3, 4 are closed and a sheet 1 is disposed therebetween (FIG. 2) the electrode 10 is close to, but does not touch, an edge portion of the glass sheet 1, each electrode 10 spanning the two sharp edges of the sheet. Conveniently, an electrode 10 is arranged at each corner of the die 4 where, as shown, rectangular dies are used. Adjacent electrodes 10 around the periphery of the die 4 are arranged to be connected to opposite respective phases of a two-phase high-voltage alternating supply 11, typically 1,000 volts at 50 cycles/sec. This high voltage is applied between adjacent pairs of electrodes 10 successively and at intervals of a few seconds, immediately following closure of the dies 3, 4 whereupon arcing takes place across the small gaps between each respective pair of electrodes 10 and the respective carbon coatings. An electric current can therefore pass between adjacent pairs of electrodes 10 through the carbon coatings, causing the carbon to burn off, slightly melting the peripheral glass edge in the process to produce the desired rounding-off. Alternatively, the electrodes 10 may be spaced at equal distances around the periphery, adjacent electrodes being connected to opposite phases of the supply 11.

After rounding of the glass edges is completed, the high voltage is disconnected from the electrodes 10 and the dies 3, 4 separated (FIG. 3). The glass sheet 1 suspended by the tongs 2 is then moved to the following stage in the treatment process, for example, a toughening or annealing stage, as in the embodiment described previously with reference to FIG. 1.

The edge treatment of a heated glass sheet has been described in the illustrated embodiments as applied to a glass sheet suspended vertically from its upper margin. It will be appreciated that the invention is equally applicable to a sheet of glass which is supported horizontally on a peripheral bending mould. A flat glass sheet is placed on a horizontal mould shaped to the configuration of the required curved glass sheet. The glass sheet and the mould are advanced through a furnace in which they are heated to a temperature at or above the softening point of the glass, whereupon the glass sheet sags under its own weight into conformity with the peripheral mould. While the glass is still hot, and before it is removed from the furnace, edge treatment to round-off the sharp edges of the sheet is carried out either using burners, as described with reference to FIG. 1, or by passing a current through a previously applied carbon coating, as described with reference to FIGS. 2 and 3.

Where the edge treatment of the present invention is to be applied to a heated glass sheet which is to be subsequently toughened, without bending, she sheet is conveniently suspended vertically and held stationary with respect to suitable fixed marginal heating means, using flat-faced dies, steady wires, or any other convenient means, to hold the glass while the heating means are operative to heat the exposed edges of the sheet.

A considerable saving in heating costs is realised by applying the thermal edge treatment of the present invention to a glass sheet which has already been heated preparatory to bending or toughening.

A glass sheet resulting from the edge treatment according to the invention has rounded-off smooth edges, resulting from the partial melting of the glass at said edges. The invention therefore also includes a glass sheet which has been treated by the method or apparatus herein described.

I claim:
1. A method of treating a glass sheet having a sharp edge comprising the steps of heating the sheet preparatory to bending thereof, bending the heated sheet and, whilst the sheet is gripped between complementary bending dies, exposing a continuous peripheral margin of the sheet and applying further heat thereto to cause rounding of the edge of said margin.

2. A method of according to claim 1, in which the edge heating is effected by subjecting the exposed margin of the sheet to the action of a heated gas applied along the edge.

3. A method according to claim 1, in which the edge heating is effected by coating the said peripheral margin of the sheet with at least one coating of electrically conductive material and passing an electric current through said coating or coatings to cause partial melting of the glass at said margin.

4. A method according to claim 3, in which two coatings are provided, said coatings comprising respective strips of conductive material adjacent respective sheet edges on respective major surfaces of the sheet.

5. A method according to claim 3, in which two coatings are provided, said coatings comprising respective strips of conductive material adjacent respective sheet edges on the peripheral edge surface of the sheet.

6. A method according to claim 3, in which the conductive material comprises finely-divided carbon.

7. A method according to claim 3, in which the edge of the sheet is defined on the parent sheet by scoring a line thereon prior to breaking-out of the sheet from a parent sheet, the conductive material being applied simultaneously to the major surfaces of the sheet to be broken out adjacent said scored line by an applicator device disposed in a fixed position relative to the scoring means.

8. A method according to claim 1 in which the edge heating of the glass sheet is effected after bending has been effected by said dies, and prior to toughening of the glass sheet.

9. Apparatus for treating a glass sheet having sharp edges, comprising a pair of bending dies, means for heating a glass sheet preparatory to bending thereof, means supporting the heated sheet between said dies with a continuous peripheral margin of the sheet exposed, and marginal heating means disposed in fixed relationship to the dies and effective to heat the exposed edge of the sheet to cause rounding thereof upon closure of the dies.

10. Apparatus according to claim 9, wherein the marginal heating means comprise a frame encircling the closed position of the dies and a plurality of burners mounted on the frame and directed towards the region occupied by the peripheral margin of a said sheet when received between the dies.

11. Apparatus according to claim 10, in which the burners comprise respective nozzles having outlets which are elongated in the direction of extension of the peripheral margin of a glass sheet when received between the dies.

12. Apparatus according to claim 9, including means applying an electrically conductive coating to the peripheral margin of the sheet, the marginal heating means comprising electrodes adapted to be disposed close to but spaced from the edges of a glass sheet received between the dies, and a high voltage source connected across respective pairs of said electrodes and effective to cause arcing between the electrodes and the conductive coating, thereby permitting a heating current to flow through the coating.

13. Apparatus according to claim 9, in which edge-gripping devices are provided for suspending a sheet to be treated by an upper edge, the dies being relatively movable horizontally.

References Cited

UNITED STATES PATENTS

| | | | |
|---|---|---|---|
| 3,008,270 | 11/1961 | Hohmann et al. | 65—273X |
| 3,268,316 | 8/1966 | Snyder | 65—273X |

ARTHUR D. KELLOGG, Primary Examiner

U.S. Cl. X.R.

65—106, 273, 284